(12) United States Patent
Lee et al.

(10) Patent No.: US 8,243,665 B2
(45) Date of Patent: Aug. 14, 2012

(54) METHOD FOR SELECTION AND SIGNALING OF DOWNLINK AND UPLINK BANDWIDTH IN WIRELESS NETWORKS

(75) Inventors: Young-Dae Lee, Gyeonggi-Do (KR); Sung-Duck Chun, Gyeonggi-Do (KR); Myung-Cheul Jung, Seoul (KR); Sung-Jun Park, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 577 days.

(21) Appl. No.: 12/278,558

(22) PCT Filed: Jan. 30, 2007

(86) PCT No.: PCT/KR2007/000510
§ 371 (c)(1),
(2), (4) Date: Aug. 6, 2008

(87) PCT Pub. No.: WO2007/091795
PCT Pub. Date: Aug. 16, 2007

(65) Prior Publication Data
US 2009/0010219 A1 Jan. 8, 2009

Related U.S. Application Data

(66) Substitute for application No. 60/771,305, filed on Feb. 7, 2006.

(60) Provisional application No. 60/784,976, filed on Mar. 22, 2006.

(30) Foreign Application Priority Data

Dec. 28, 2006 (KR) .................. 10-2006-0137123

(51) Int. Cl.
*G01R 31/08* (2006.01)
(52) U.S. Cl. ........ 370/329; 370/338; 370/468; 455/450; 455/509
(58) Field of Classification Search .................. 370/277, 370/295, 345, 347, 349, 352, 389, 401, 252, 370/253, 328–338, 468; 455/234.1, 422.1, 455/433, 445, 449, 561, 564, 565, 450–453
See application file for complete search history.

(56) References Cited

U.S. PATENT DOCUMENTS 6,138,158 A 10/2000 Boyle et al.
(Continued)

FOREIGN PATENT DOCUMENTS

CN 1411668 4/2003
(Continued)

OTHER PUBLICATIONS

M. Haardt et al., "The TD-CDMA Based UTRA TDD Mode," IEEE Journal on Selected Areas in Communications, vol. 18, No. 8, pp. 1375-1385, Aug. 2000.
(Continued)

*Primary Examiner* — Hassan Phillips
*Assistant Examiner* — Anez Ebrahim
(74) *Attorney, Agent, or Firm* — Lee, Hong, Degerman, Kang & Waimey

(57) ABSTRACT

In a wireless mobile communications system, a method of receiving data or signaling on a channel from a cell having a plural of divisions of cell bandwidth. Utilizing one or more sub-bandwidths to receive data or a signaling from the cell, thereby optimizing data or signaling transmission efficiency.

17 Claims, 6 Drawing Sheets

U.S. PATENT DOCUMENTS

| | | | |
|---|---|---|---|
| 6,317,430 B1 | 11/2001 | Knisely et al. | |
| 6,381,229 B1 | 4/2002 | Narvinger et al. | |
| 6,480,525 B1 | 11/2002 | Parsa et al. | |
| 6,571,102 B1 | 5/2003 | Hogberg et al. | |
| 6,597,668 B1 | 7/2003 | Schafer et al. | |
| 6,694,148 B1 | 2/2004 | Frodigh et al. | |
| 6,717,925 B1 | 4/2004 | Leppisaari et al. | |
| 6,728,225 B1 | 4/2004 | Ozluturk | |
| 6,785,510 B2 | 8/2004 | Larsen | |
| 6,791,963 B1 | 9/2004 | Hwang et al. | |
| 6,795,412 B1 | 9/2004 | Lee | |
| 6,850,504 B1 | 2/2005 | Cao et al. | |
| 6,859,445 B1 | 2/2005 | Moon et al. | |
| 6,882,727 B1 | 4/2005 | Vialen et al. | |
| 6,907,005 B1 | 6/2005 | Dahlman et al. | |
| 6,907,015 B1 | 6/2005 | Moulsley et al. | |
| 6,947,394 B1 | 9/2005 | Johansson et al. | |
| 6,950,420 B2 | 9/2005 | Sarkkinen et al. | |
| 6,965,580 B1 | 11/2005 | Takagi et al. | |
| 7,016,343 B1 | 3/2006 | Mermel et al. | |
| 7,031,708 B2 | 4/2006 | Sarkkinen et al. | |
| 7,075,971 B2 | 7/2006 | Parsa et al. | |
| 7,099,309 B2 | 8/2006 | Davidson | |
| 7,145,895 B2 | 12/2006 | Mueckenheim et al. | |
| 7,151,758 B2 | 12/2006 | Kumaki et al. | |
| RE39,454 E | 1/2007 | Cantoni et al. | |
| 7,184,792 B2 | 2/2007 | Mir | |
| 7,236,787 B1 | 6/2007 | Tamura et al. | |
| 7,239,870 B2 | 7/2007 | Zhang et al. | |
| 7,359,345 B2 | 4/2008 | Chang et al. | |
| 7,359,349 B2 | 4/2008 | Kayama et al. | |
| 7,376,424 B2 | 5/2008 | Kim et al. | |
| 7,385,952 B2 | 6/2008 | Mantha et al. | |
| 7,398,108 B2 | 7/2008 | Hondo | |
| 7,430,206 B2 | 9/2008 | Terry et al. | |
| 7,436,801 B1 | 10/2008 | Kanterakis | |
| 7,443,816 B2 | 10/2008 | Chen et al. | |
| 7,496,113 B2 | 2/2009 | Cai et al. | |
| 7,535,886 B2 | 5/2009 | Lee et al. | |
| 7,590,089 B2 | 9/2009 | Park et al. | |
| 7,664,059 B2 | 2/2010 | Jiang | |
| 7,729,719 B2 | 6/2010 | Bergstrom et al. | |
| 7,778,599 B2 | 8/2010 | Li et al. | |
| 7,826,859 B2 | 11/2010 | Lee et al. | |
| 7,848,308 B2 | 12/2010 | Lee et al. | |
| 7,881,724 B2 | 2/2011 | Park et al. | |
| 8,031,668 B2 | 10/2011 | Wang et al. | |
| 8,036,110 B2 | 10/2011 | Ishii et al. | |
| 8,068,511 B2 | 11/2011 | Reznik et al. | |
| 8,090,382 B2 | 1/2012 | Park et al. | |
| 2001/0024956 A1 | 9/2001 | You | |
| 2001/0046864 A1 | 11/2001 | Bhatoolaul et al. | |
| 2002/0009129 A1 | 1/2002 | Choi et al. | |
| 2002/0021714 A1 | 2/2002 | Seguin | |
| 2002/0028690 A1 | 3/2002 | McKenna et al. | |
| 2002/0032884 A1 | 3/2002 | Kobata et al. | |
| 2002/0044527 A1 | 4/2002 | Jiang | |
| 2002/0071480 A1 | 6/2002 | Marjelund et al. | |
| 2002/0090004 A1 | 7/2002 | Rinchiuso | |
| 2002/0093940 A1 | 7/2002 | Toskala | |
| 2002/0116515 A1 | 8/2002 | Hashimoto | |
| 2002/0126629 A1 | 9/2002 | Jiang et al. | |
| 2002/0160744 A1 | 10/2002 | Choi et al. | |
| 2002/0181436 A1 | 12/2002 | Mueckenheim | |
| 2002/0187789 A1 | 12/2002 | Diachina | |
| 2002/0191559 A1 | 12/2002 | Chen et al. | |
| 2003/0003920 A1* | 1/2003 | Sebastian | 455/452 |
| 2003/0007510 A1 | 1/2003 | Yeo et al. | |
| 2003/0016672 A1 | 1/2003 | Rosen et al. | |
| 2003/0043741 A1* | 3/2003 | Mukai et al. | 370/229 |
| 2003/0050097 A1 | 3/2003 | Amirijoo et al. | |
| 2003/0054829 A1* | 3/2003 | Moisio | 455/452 |
| 2003/0076812 A1 | 4/2003 | Benedittis | |
| 2003/0078046 A1 | 4/2003 | Seo | |
| 2003/0084185 A1 | 5/2003 | Pinkerton | |
| 2003/0087655 A1 | 5/2003 | Matsuoka | |
| 2003/0103476 A1 | 6/2003 | Choi et al. | |
| 2003/0131124 A1 | 7/2003 | Yi et al. | |
| 2003/0137931 A1 | 7/2003 | Hans et al. | |
| 2003/0139170 A1 | 7/2003 | Heo | |
| 2003/0147371 A1 | 8/2003 | Choi | |
| 2003/0210669 A1 | 11/2003 | Vayanos et al. | |
| 2003/0223393 A1 | 12/2003 | Lee | |
| 2003/0236085 A1 | 12/2003 | Ho | |
| 2004/0002334 A1* | 1/2004 | Lee et al. | 455/436 |
| 2004/0004954 A1 | 1/2004 | Terry et al. | |
| 2004/0006643 A1 | 1/2004 | Dolson et al. | |
| 2004/0008658 A1 | 1/2004 | Dahlman et al. | |
| 2004/0008659 A1 | 1/2004 | Kim | |
| 2004/0014452 A1 | 1/2004 | Lim et al. | |
| 2004/0028078 A1 | 2/2004 | Beckmann | |
| 2004/0057387 A1 | 3/2004 | Yi et al. | |
| 2004/0077357 A1 | 4/2004 | Nakada | |
| 2004/0103435 A1 | 5/2004 | Yi et al. | |
| 2004/0109422 A1 | 6/2004 | Naito | |
| 2004/0114593 A1 | 6/2004 | Dick et al. | |
| 2004/0114606 A1 | 6/2004 | Haddad | |
| 2004/0116143 A1 | 6/2004 | Love et al. | |
| 2004/0117860 A1 | 6/2004 | Yi et al. | |
| 2004/0125772 A9* | 7/2004 | Wu et al. | 370/335 |
| 2004/0143676 A1 | 7/2004 | Baudry et al. | |
| 2004/0146019 A1 | 7/2004 | Kim et al. | |
| 2004/0147266 A1* | 7/2004 | Hwang et al. | 455/445 |
| 2004/0147271 A1 | 7/2004 | Billon et al. | |
| 2004/0157602 A1 | 8/2004 | Khawand | |
| 2004/0171395 A1 | 9/2004 | Shin | |
| 2004/0180675 A1 | 9/2004 | Choi et al. | |
| 2004/0184437 A1 | 9/2004 | Lee et al. | |
| 2004/0185860 A1 | 9/2004 | Marjelund | |
| 2004/0196861 A1 | 10/2004 | Rinchiuso et al. | |
| 2004/0198369 A1 | 10/2004 | Kwak et al. | |
| 2004/0202140 A1 | 10/2004 | Kim et al. | |
| 2004/0208160 A1 | 10/2004 | Petrovic et al. | |
| 2004/0219920 A1 | 11/2004 | Love et al. | |
| 2004/0229626 A1* | 11/2004 | Yi et al. | 455/450 |
| 2004/0248600 A1 | 12/2004 | Kim | |
| 2004/0264497 A1 | 12/2004 | Wang et al. | |
| 2004/0264550 A1 | 12/2004 | Dabak | |
| 2004/0266494 A1 | 12/2004 | Ruuska et al. | |
| 2005/0008035 A1 | 1/2005 | Eklund et al. | |
| 2005/0014508 A1 | 1/2005 | Philips | |
| 2005/0020260 A1 | 1/2005 | Jeong et al. | |
| 2005/0025039 A1 | 2/2005 | Hwang et al. | |
| 2005/0039101 A1 | 2/2005 | Torsner | |
| 2005/0059407 A1 | 3/2005 | Reed et al. | |
| 2005/0059421 A1 | 3/2005 | Reed et al. | |
| 2005/0063336 A1* | 3/2005 | Kim et al. | 370/329 |
| 2005/0073987 A1 | 4/2005 | Wu | |
| 2005/0105482 A1 | 5/2005 | Kobayashi et al. | |
| 2005/0107036 A1 | 5/2005 | Song et al. | |
| 2005/0111393 A1 | 5/2005 | Jeong et al. | |
| 2005/0129058 A1 | 6/2005 | Casaccia et al. | |
| 2005/0135416 A1 | 6/2005 | Ketchum et al. | |
| 2005/0157696 A1 | 7/2005 | Yamamoto et al. | |
| 2005/0185608 A1 | 8/2005 | Lee et al. | |
| 2005/0190728 A1 | 9/2005 | Han et al. | |
| 2005/0195732 A1 | 9/2005 | Huh et al. | |
| 2005/0197134 A1* | 9/2005 | McKenna et al. | 455/452.1 |
| 2005/0207374 A1 | 9/2005 | Petrovic et al. | |
| 2005/0213605 A1 | 9/2005 | Kim et al. | |
| 2005/0243767 A1 | 11/2005 | Zhang et al. | |
| 2005/0249141 A1 | 11/2005 | Lee et al. | |
| 2005/0249222 A1 | 11/2005 | van Kampen et al. | |
| 2005/0250500 A1 | 11/2005 | Xu | |
| 2005/0260997 A1 | 11/2005 | Korale | |
| 2005/0265301 A1 | 12/2005 | Heo et al. | |
| 2005/0271025 A1 | 12/2005 | Guethaus et al. | |
| 2005/0281212 A1 | 12/2005 | Jeong et al. | |
| 2005/0288026 A1 | 12/2005 | Byun et al. | |
| 2006/0007886 A1 | 1/2006 | Lee et al. | |
| 2006/0018289 A1 | 1/2006 | Schulist et al. | |
| 2006/0025079 A1 | 2/2006 | Sutskover et al. | |
| 2006/0030342 A1 | 2/2006 | Hwang et al. | |
| 2006/0045047 A1* | 3/2006 | Choi et al. | 370/329 |
| 2006/0056347 A1 | 3/2006 | Kwak et al. | |
| 2006/0059186 A1 | 3/2006 | Backlund | |
| 2006/0062196 A1 | 3/2006 | Cai et al. | |

| Publication No. | Date | Inventor |
|---|---|---|
| 2006/0072494 A1 | 4/2006 | Matusz |
| 2006/0083183 A1 | 4/2006 | Teague et al. |
| 2006/0088009 A1 | 4/2006 | Gibbs et al. |
| 2006/0120403 A1 | 6/2006 | Murata et al. |
| 2006/0143300 A1 | 6/2006 | See et al. |
| 2006/0146745 A1 | 7/2006 | Cai et al. |
| 2006/0153232 A1 | 7/2006 | Shvodian |
| 2006/0154680 A1 | 7/2006 | Kroth et al. |
| 2006/0168343 A1 | 7/2006 | Ma et al. |
| 2006/0193282 A1 | 8/2006 | Ikawa et al. |
| 2006/0256818 A1 | 11/2006 | Shvodian et al. |
| 2006/0292982 A1 | 12/2006 | Ye et al. |
| 2007/0060146 A1 | 3/2007 | Won et al. |
| 2007/0071025 A1 | 3/2007 | Bergstrom et al. |
| 2007/0081483 A1 | 4/2007 | Jang et al. |
| 2007/0081513 A1 | 4/2007 | Torsner |
| 2007/0098006 A1 | 5/2007 | Parry et al. |
| 2007/0104151 A1 | 5/2007 | Papasakellariou et al. |
| 2007/0117579 A1 | 5/2007 | Cai et al. |
| 2007/0121543 A1 | 5/2007 | Kuchibhotla et al. |
| 2007/0133458 A1 | 6/2007 | Chandra et al. |
| 2007/0135080 A1 | 6/2007 | Islam et al. |
| 2007/0140115 A1 | 6/2007 | Bienas et al. |
| 2007/0147326 A1 | 6/2007 | Chen |
| 2007/0206531 A1 | 9/2007 | Pajukoski et al. |
| 2007/0218930 A1 | 9/2007 | Kuo |
| 2007/0254662 A1 | 11/2007 | Khan et al. |
| 2007/0274253 A1 | 11/2007 | Zhang et al. |
| 2008/0031253 A1 | 2/2008 | Kim et al. |
| 2008/0069031 A1 | 3/2008 | Zhang et al. |
| 2008/0095105 A1 | 4/2008 | Sundberg et al. |
| 2008/0130643 A1 | 6/2008 | Jain et al. |
| 2008/0137564 A1 | 6/2008 | Herrmann |
| 2008/0212541 A1 | 9/2008 | Vayanos et al. |
| 2008/0232291 A1 | 9/2008 | Hus et al. |
| 2008/0267136 A1 | 10/2008 | Baker et al. |
| 2009/0011769 A1 | 1/2009 | Park et al. |
| 2009/0175241 A1 | 7/2009 | Ohta et al. |
| 2009/0185477 A1 | 7/2009 | Lee et al. |
| 2009/0319850 A1 | 12/2009 | Baek et al. |
| 2009/0323624 A1 | 12/2009 | Kim |
| 2009/0323646 A1 | 12/2009 | Ketchum et al. |
| 2010/0014430 A1 | 1/2010 | Oka et al. |
| 2010/0034095 A1 | 2/2010 | Ho et al. |
| 2010/0103899 A1 | 4/2010 | Kwak et al. |
| 2010/0105334 A1 | 4/2010 | Terry et al. |
| 2010/0226263 A1 | 9/2010 | Chun et al. |
| 2011/0038376 A1 | 2/2011 | Wiemann et al. |

FOREIGN PATENT DOCUMENTS

| | | |
|---|---|---|
| CN | 1649285 | 8/2005 |
| CN | 1658545 | 8/2005 |
| CN | 1663158 | 8/2005 |
| CN | 1692661 | 11/2005 |
| EP | 0978958 | 2/2000 |
| EP | 1009184 | 6/2000 |
| EP | 1261222 | 11/2002 |
| EP | 1392074 | 2/2004 |
| EP | 1441473 | 7/2004 |
| EP | 1478203 | 11/2004 |
| EP | 1557968 | 7/2005 |
| EP | 1599063 | 11/2005 |
| EP | 1605724 | 12/2005 |
| EP | 1684538 | 7/2006 |
| JP | 06-013959 | 1/1994 |
| JP | 06-121001 | 4/1994 |
| JP | 09-055693 | 2/1997 |
| JP | 09-186704 | 7/1997 |
| JP | 09-327072 | 12/1997 |
| JP | 11-308671 | 11/1999 |
| JP | 11331949 | 11/1999 |
| JP | 2000032088 | 1/2000 |
| JP | 2000-151494 | 5/2000 |
| JP | 2000-175271 | 6/2000 |
| JP | 2000-184428 | 6/2000 |
| JP | 2001-095031 | 4/2001 |
| JP | 2001-298770 | 10/2001 |
| JP | 2001522557 | 11/2001 |
| JP | 2002501695 | 1/2002 |
| JP | 2002064589 | 2/2002 |
| JP | 2002135231 | 5/2002 |
| JP | 2002-374321 | 12/2002 |
| JP | 2003-008635 | 1/2003 |
| JP | 2003504942 | 2/2003 |
| JP | 2003504968 | 2/2003 |
| JP | 2003078480 | 3/2003 |
| JP | 2003-116172 | 4/2003 |
| JP | 2003-174470 | 6/2003 |
| JP | 2003-333661 | 11/2003 |
| JP | 2004-128967 | 4/2004 |
| JP | 2004-312771 | 11/2004 |
| JP | 2004-320165 | 11/2004 |
| JP | 2004349884 | 12/2004 |
| JP | 2005500761 | 1/2005 |
| JP | 2005510950 | 4/2005 |
| JP | 2005517369 | 6/2005 |
| JP | 2005522923 | 7/2005 |
| JP | 2005-217743 | 8/2005 |
| JP | 2005525066 | 8/2005 |
| JP | 2005525720 | 8/2005 |
| JP | 2005-236988 | 9/2005 |
| JP | 2005-237013 | 9/2005 |
| JP | 2005-244958 | 9/2005 |
| JP | 2005-278167 | 10/2005 |
| JP | 2005-536168 | 11/2005 |
| JP | 2005-539462 | 12/2005 |
| JP | 2006-014372 | 1/2006 |
| JP | 2006-020044 | 1/2006 |
| JP | 2006-025437 | 1/2006 |
| JP | 2006-505998 | 2/2006 |
| JP | 2006-352705 | 12/2006 |
| JP | 2007536790 | 12/2007 |
| JP | 2009-284532 | 12/2009 |
| KR | 1020010111634 | 12/2001 |
| KR | 1020010111637 | 12/2001 |
| KR | 20040048675 | 6/2004 |
| KR | 20040064867 | 7/2004 |
| KR | 20040089937 | 10/2004 |
| KR | 1020050122979 | 12/2005 |
| KR | 1020060016436 | 2/2006 |
| KR | 1020060040367 | 5/2006 |
| RU | 2168278 | 5/2001 |
| RU | 2191479 | 10/2002 |
| RU | 2232469 | 7/2004 |
| RU | 2232477 | 7/2004 |
| RU | 2237380 | 9/2004 |
| RU | 2263415 | 10/2005 |
| RU | 2005115869 | 10/2005 |
| RU | 2270526 | 2/2006 |
| TW | 407407 | 10/2000 |
| TW | 548916 | 8/2003 |
| TW | 552815 | 9/2003 |
| TW | 586283 | 5/2004 |
| TW | 589818 | 6/2004 |
| TW | 592412 | 6/2004 |
| TW | I228008 | 2/2005 |
| TW | I229268 | 3/2005 |
| TW | I229514 | 3/2005 |
| TW | 200522579 | 7/2005 |
| TW | I237478 | 8/2005 |
| TW | I239731 | 9/2005 |
| TW | I239756 | 9/2005 |
| TW | I242951 | 11/2005 |
| TW | I253824 | 4/2006 |
| TW | 280755 | 5/2007 |
| WO | 9960729 | 11/1999 |
| WO | 99/63713 | 12/1999 |
| WO | 02/39697 | 5/2002 |
| WO | 02/39760 | 5/2002 |
| WO | 02/43403 | 5/2002 |
| WO | 02/47417 | 6/2002 |
| WO | 02075442 | 9/2002 |
| WO | 02/102110 | 12/2002 |
| WO | 03/007636 | 1/2003 |
| WO | 03/017691 | 2/2003 |
| WO | 03/043259 | 5/2003 |
| WO | 03/047155 | 6/2003 |
| WO | 03/056723 | 7/2003 |

| | | |
|---|---|---|
| WO | 03/096571 | 11/2003 |
| WO | 2004/030393 | 4/2004 |
| WO | 2004/034656 | 4/2004 |
| WO | 2004045234 | 5/2004 |
| WO | 2004/089030 | 10/2004 |
| WO | 2004/091130 | 10/2004 |
| WO | 2005/006660 | 1/2005 |
| WO | 2005/018269 | 2/2005 |
| WO | 2005/034418 | 4/2005 |
| WO | 2005/036917 | 4/2005 |
| WO | 2005/055472 | 6/2005 |
| WO | 2005/071887 | 8/2005 |
| WO | 2005/074312 | 8/2005 |
| WO | 2005/088886 | 9/2005 |
| WO | 2005099125 | 10/2005 |
| WO | 2005/109695 | 11/2005 |
| WO | 2005/109837 | 11/2005 |
| WO | 2005/117317 | 12/2005 |
| WO | 2005/119941 | 12/2005 |
| WO | 2005/125125 | 12/2005 |
| WO | 2006/011953 | 2/2006 |
| WO | 2006/012946 | 2/2006 |
| WO | 2006/033552 | 3/2006 |
| WO | 2007/095966 | 8/2007 |
| WO | 2007091831 | 8/2007 |

OTHER PUBLICATIONS

Ericsson, "E-UTRA Random Access"; TSG-RAN WG1 #43; Seoul, Korea; Nov. 2005; R1-051445.
Sarkar, S., et al., "Common-Channel Soft Handoff in CDMA2000," IEEE Transactions on Microwave Theory and Techniques, Jun. 2000, pp. 938-950, vol. 48, Issue 6.
NTT Docomo, et al., "Multiplexing Method of Shared Control Channel in Uplink Single-Carrier FDMA Radio Access," 3GPP TSG-RAN WG1, R1-051143, Oct. 10, 2005.
Huawei, "Further Considerations on Multiplexing Method of Shared Control Channel in Uplink Single-Carrier FDMA," 3GPP TSG-RAN WG1, R1-051430, Nov. 7, 2005.
Philips, "Evolved Paging Indicators for LTE," 3GPP TSG-RAN WG2, R2-052985, Nov. 7, 2005.
NTT Docomo, et al., "Paging Channel Structure for E-UTRA Downlink," 3GPP TSG-RAN WG1, R1-060034, Jan. 23, 2006.
LG Electronics Inc., "HARG and ARQ Operation," 3GPP TSG-RAN WG2, R2-060106, Jan. 9, 2006.
LG Electronics Inc., "Framing in the MAC Entity," 3GPP TSG-RAN WG2, R2-061012, Mar. 27, 2006.
Motorola, "Paging Channel Design for E-UTRA," 3GPP TSG-RAN WG1, R1-061712, Jun. 27, 2006.
China Mobile Communications Co., "RRC States Analysis in LTE," R2-052140, 3GPP TSG RAN WG2 #48, Aug. 2005.
Panasonic, "E-UTRA Transport and Logical Channels," R2-052860, 3GPP TSG RAN WG2#49, Nov. 2005.
Siemens, "States in E-UTRAN," R2-052051, 3GPP TSG-RAN WG RAN2#48, Aug. 2005.
Qualcomm Europe, "Signaling optimization for E-UTRAN," R2-052407, 3GPP TSG-RAN Wg 2 meeting #48-bis, Oct. 2005.
Xu, H., et al.; "Performance Analysis on the Radio Link Control Protocol of UMTS System"; 2002 IEEE 56th Vehicular Technology Conference Proceedings; pp. 2026-2030; Sep. 2002.
3rd Generation Partnership Project (3GPP), "Technical Specification Group Radio Access Network; Evolved Universal Terrestrial Radio Access (E-UTRA) Medium Access Control (MAC) protocol specification (Release 8)," 3GPP TS 36.321, V8.4.0, Dec. 2008.
Qualcomm, "Need for MAC-hs segmentation mechanism," R2-020769, 3GPP TSG-RAN WG2 meeting #28, Apr. 2002.
Motorola et al., "MAC-e/es header and functional split," R2-042360, 3GPP TSG RAN WG2 Meeting#45, Nov. 2004.
LG Electronics Inc., "MAC Enhancement," R2-060561, 3GPP TSG-RAN WG2 #51, Feb. 2006.
Ericsson, "Solution for sending NAS together with RRC connection request", 3GPP TSG-RAN WG2#58, R2-071817, May 7, 2007.
LG Electroncs Inc., "Default SRB for initial access", 3GPP TSG-RAN WG 2 LTE Ad-hoc, R2-061958, Jun. 27, 2006.
LG Electronics Inc., "UE state transition in LTE_ACTIVE," 3GPP TSG-RAN WG2#52, R2-061002, Mar. 27, 2006.
Ericsson, "LTE States in E-UTRAN," 3GPP TSG-RAN WG2 Meeting #48bis, R2-052425, Oct. 10, 2005.
LG Electronics Inc., "UE State Transition in LTE_ACTIVE," R2-061002, 3GPP TSG-RAN WG2 #52, Mar. 2006.
IPWireless, "Layer 2 functions for LTE," R2-052377, 3GPP TSG RAN WG2 #48bis, Oct. 2005.
Ericsson, "User plane protocol enhancements," R2-052749, TSG-RAN WG2 Meeting #48bis, Oct. 2005.
LG Electronics Inc., "MAC Architecture of LTE," R2-060105, 3GPP TSG-RAN WG2 #50, Jan. 2006.
LG Electronics Inc., "HARQ and ARQ Operation," R2-060563, 3GPP TSG-RAN WG2 #51, Feb. 2006.
LG Electronics Inc., "Discussion on RLC PDU Structure," R2-070721, 3GPP TSG-RAN WG2 #57, Feb. 2007.
3rd Generation Partnership Project (3GPP), "Technical Specification Group Radio Access Network; Introduction of the Multimedia Broadcast Multicast Service(MBMS) in the Radio Access Network (RAN); Stage 2 (Release 6)", 3GPP TS 25.346 V6.7.0, Dec. 2005.

* cited by examiner

[Fig. 1]
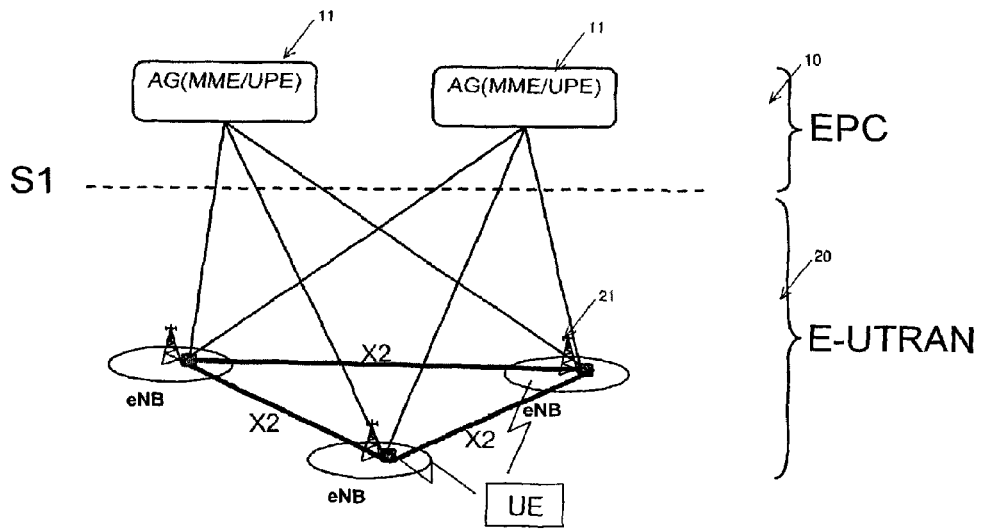
[Fig. 2]
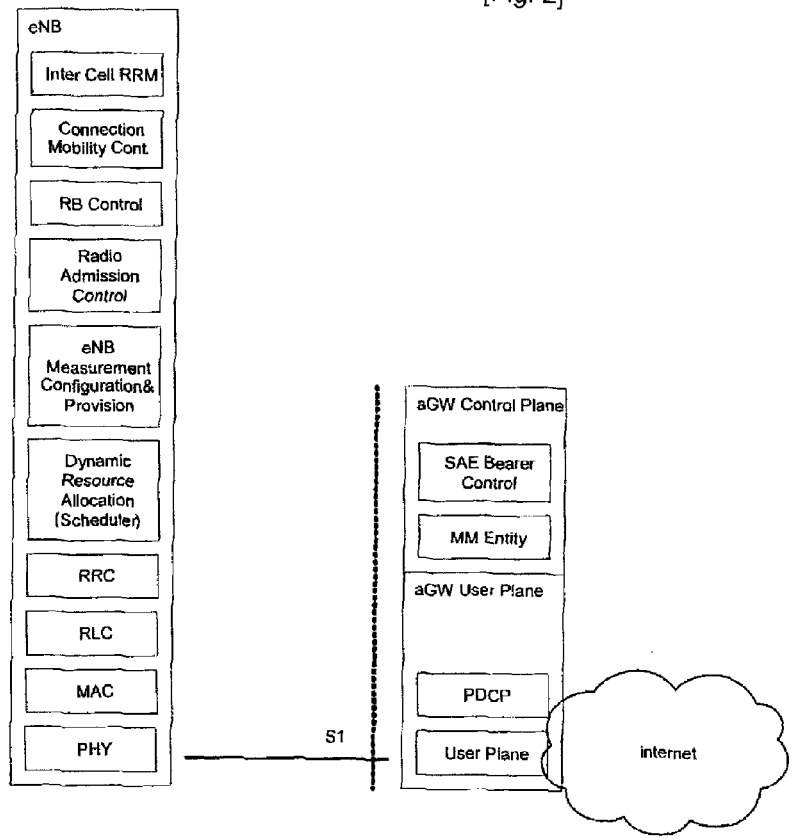

[Fig. 3]
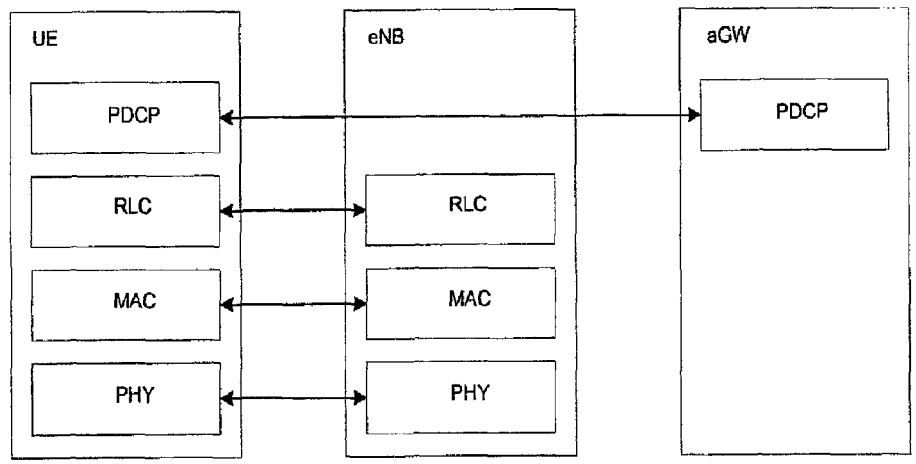
[Fig. 4]
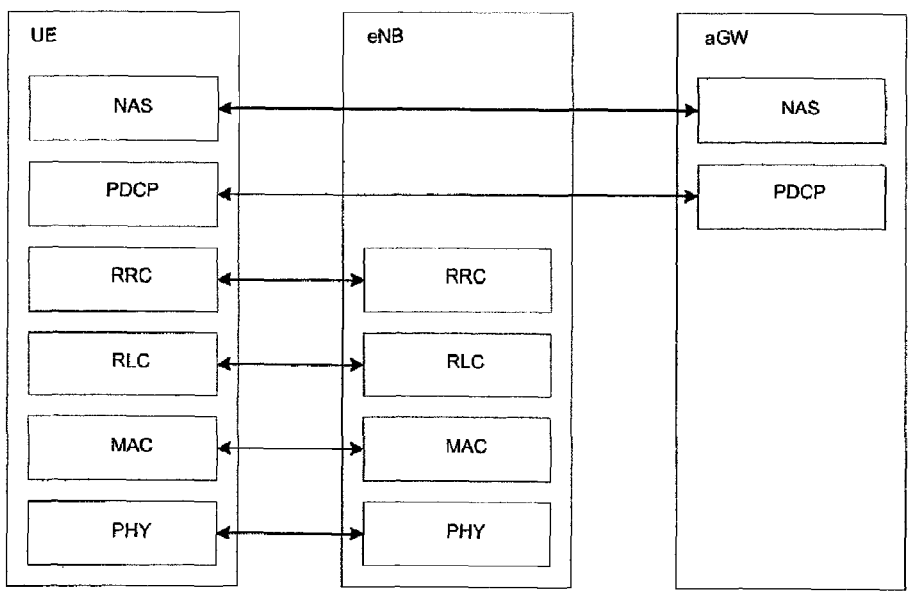
[Fig. 5]
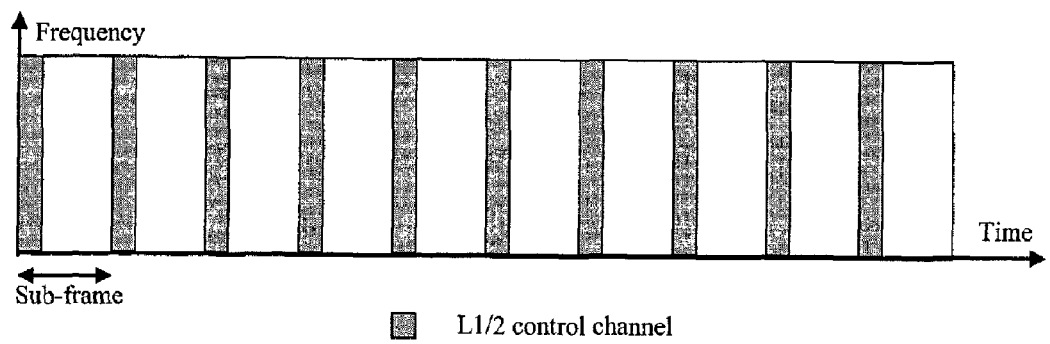

[Fig. 6]
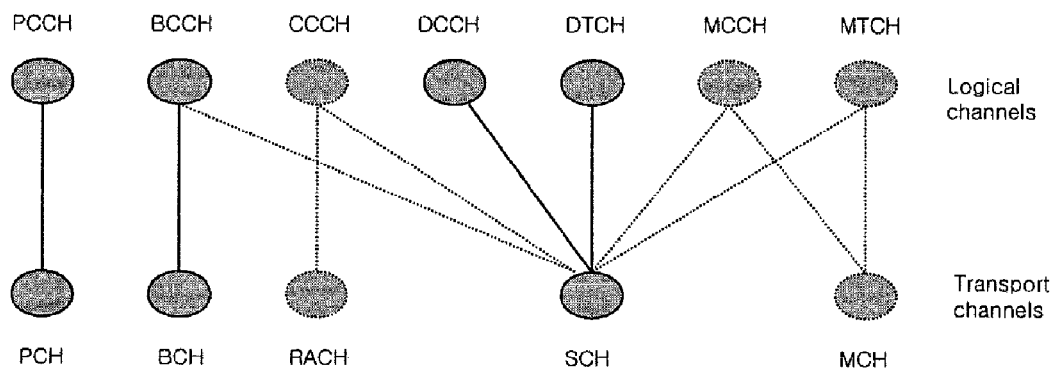
[Fig. 7]
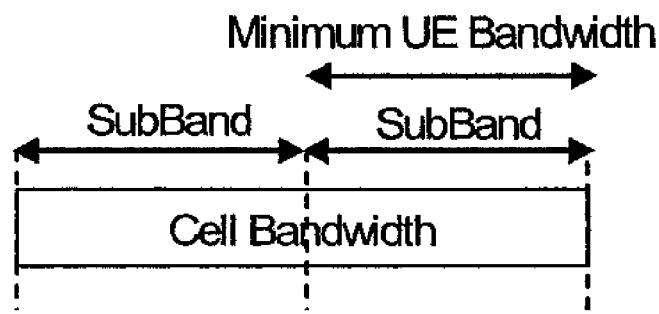
[Fig. 8]
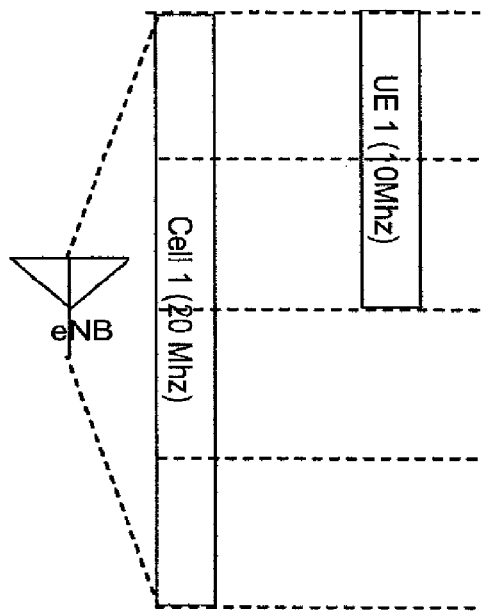

[Fig. 9]
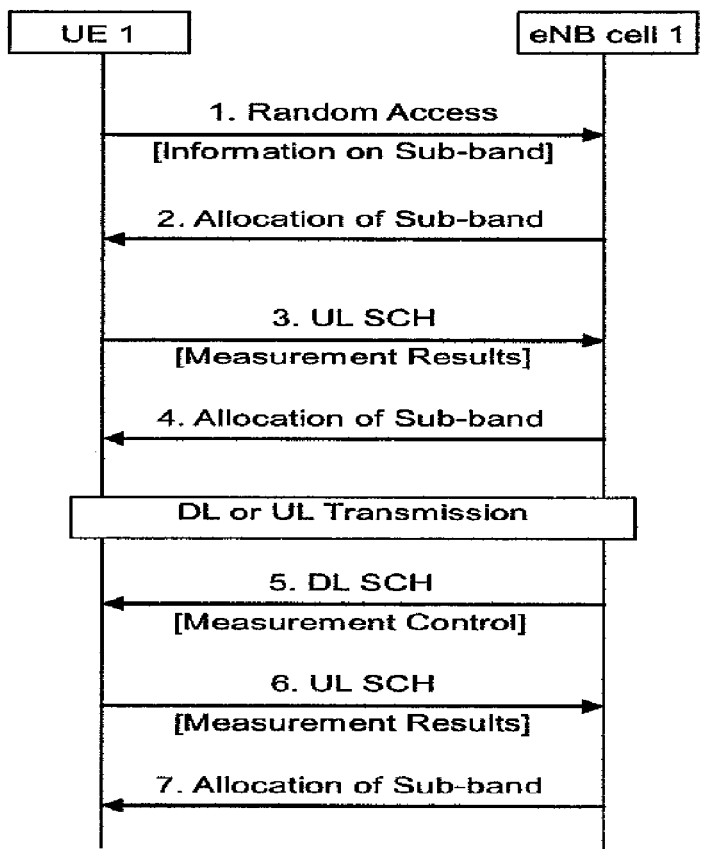
[Fig. 10]
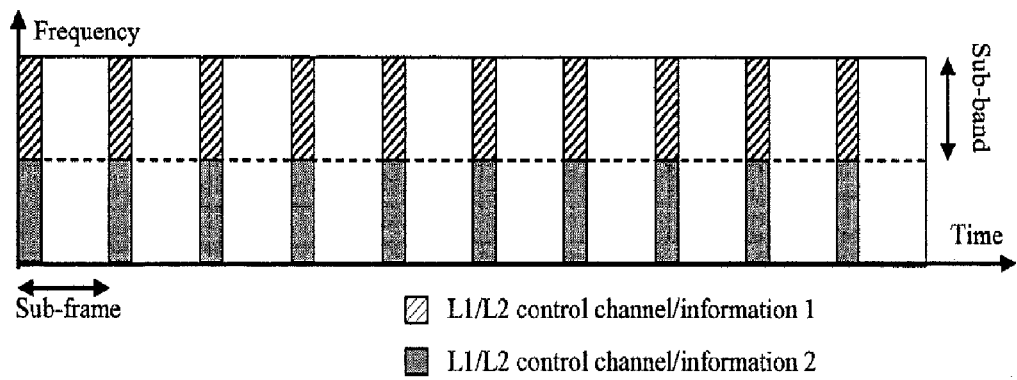

[Fig. 11]
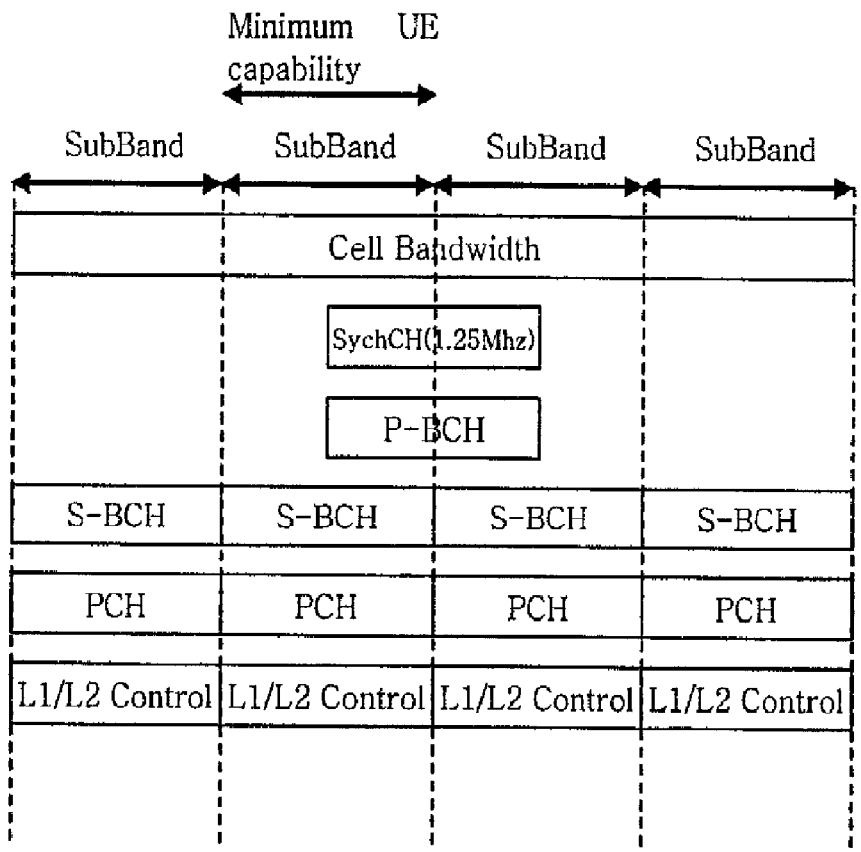
[Fig. 12]
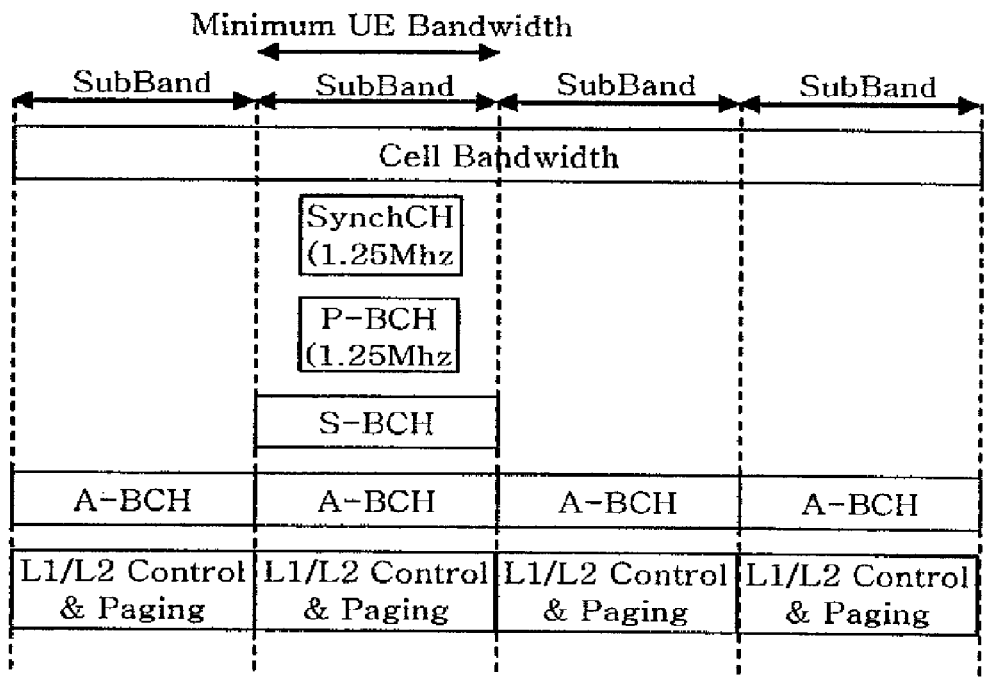

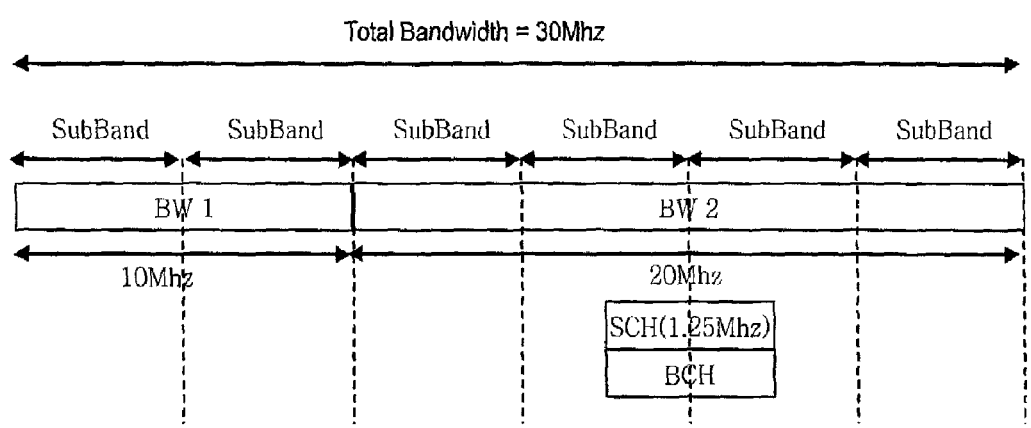
[Fig. 13]

METHOD FOR SELECTION AND SIGNALING OF DOWNLINK AND UPLINK BANDWIDTH IN WIRELESS NETWORKS

CROSS-REFERENCE TO RELATED APPLICATIONS

This application is the National Stage filing under 35 U.S.C. 371 of International Application No. PCT/KR2007/000510, filed on Jan. 30, 2007, which claims the benefit of earlier filing date and right of priority to Korean Application No. 10-2006-0137123, filed on Dec. 28, 2006, and also claims the benefit of U.S. Provisional Application Serial Nos. 60/784,976, filed on Mar. 22, 2006, and 60/771,305, filed on Feb. 7, 2006.

DISCLOSURE OF INVENTION

Technical Solution

The present invention relates to a method of receiving data or signaling on a channel from a cell having a plural of divisions of cell bandwidth. Particularly, it relates to a method of transmitting information for selecting one of the divisions of cell bandwidth, receiving a decision on the selected division of cell bandwidth from the cell, and receiving data or signaling on the selected division of cell bandwidth.

FIG. 1 is a network structure of the E-UMTS, a mobile communication system applicable to the related art and the present invention.

The E-UMTS system has been evolved from the UMTS system, for which the 3GPP is proceeding with the preparation of the basic specifications applicable thereto. The E-UMTS system can be classified as an LTE (Long Term Evolution) system.

With reference to FIG. 1, the E-UMTS network is divided into an E-UTRAN 20 and an EPC (Evolved Packet Core) 10. The E-UTRAN 20 includes a base station (eNB or eNodeB) 21. The AG 11 can be divided into a part for handling user traffic and a part for handling control traffic. The AG part for handling new user traffic and the AG part for handling control traffic can communicate with each other via newly defined interface.

One or more cells may exist for a single eNodeB (eNB) 21, and an interface for transmitting the user traffic and the control traffic can be used between the eNodeBs.

The EPC 10 may include an AG 11, a node for user registration of the UE, and the like. Also, in the UMTS of FIG. 1, an interface for discriminating the E-UTRAN 20 and the EPC 10 can be used. An S1 interface can connect a plurality of nodes (i.e., in a many-to-many manner) between the eNodeB 21 and the AG 11. The eNodeB s are connected with each other through an X2 interface, and the X2 interface is always present between adjacent eNodeBs in a meshed network structure.

FIG. 2 shows an exemplary structure (architecture) of an E-UTRAN.

As illustrated in FIG. 2, the eNB may perform functions of selection for Access gateway (AG), a routing toward the AG during a Radio Resource Control (RRC) activation, a scheduling and transmitting of paging messages, a scheduling and transmitting of Broadcast Channel (BCCH) information, a dynamic allocation of resources to UEs in both a uplink and a downlink, a configuration and provision of eNB measurements, a radio bearer control, a radio admission control (RAC), and a connection mobility control in LTE_ACTIVE state.

In the E-UTRAN, the AG may perform functions of a paging origination, a LTE-IDLE state management, a ciphering of the user plane, supporting a Packet Data Convergence Protocol (PDCP) function, a System Architecture Evolution (SAE) bearer control, and a ciphering and integrity protection of Non-Access Stratum (NAS) signalling.

FIG. 3 and FIG. 4 show the user-plane protocol and the control-plane protocol stack for the E-UTRAN. Here, the protocol layers can be divided into a first layer (L1), a second layer (L2) and a third layer (L3) based upon the three lower layers of an open system interconnection (OSI) standard model that is well-known in the art of communication systems.

The physical layer, the first layer, provides an information transmission service to an upper layer by using a physical channel. The physical layer is connected with a medium access control (MAC) layer located at a higher level through a transport channel, and data between the MAC layer and the physical layer is transferred via the transport channel. Between different physical layers, namely, between physical layers of a transmission side and a reception side, data is transferred via the physical channel.

The MAC layer of Layer 2 provides services to a radio link control (RLC) layer (which is a higher layer) via a logical channel. The RLC layer of Layer 2 supports the transmission of data with reliability. It should be noted that the RLC layer in FIGS. 2 and 3 is depicted in dotted lines, because if the RLC functions are implemented in and performed by the MAC layer, the RLC layer itself may not need to exist. The PDCP layer of Layer 2 performs a header compression function that reduces unnecessary control information such that data being transmitted by employing Internet protocol (IP) packets, such as IPv4 or IPv6, can be efficiently sent over a radio (wireless) interface that has a relatively small bandwidth.

A radio resource control (RRC) layer located at the lowest portion of the third layer (L3) is only defined in the control plane and controls logical channels, transport channels and the physical channels in relation to the configuration, reconfiguration, and release of the radio bearers (RBs). Here, the RB signifies a service provided by the second layer (L2) for data transmission between the terminal and the UTRAN.

In FIG. 3, the RLC and MAC layers (terminated in an eNB on the network side) may perform functions such as Scheduling, Automatic Repeat Request (ARQ), and Hybrid Automatic Repeat Request (HARQ). The PDCP layer (terminated in an AG on the network side) may perform for the user plane functions such as a header compression, an integrity protection, and ciphering.

In FIG. 4, the RLC and MAC layers (terminated in an eNB on the network side) perform the same functions as for the user plane. Here, The RRC (terminated in an eNB on the network side) may perform functions such as broadcasting, paging, RRC connection management, Radio Bearer (RB) control, mobility functions, and UE measurement reporting and controlling. The PDCP layer (terminated in an aGW on the network side) may perform functions for the control plane such as, an integrity protection and ciphering. The NAS (terminated in an aGW on the network side) may perform functions such as a SAE bearer management, an authentication, an idle mode mobility handling, a paging origination in LTE_IDLE, and a security control for the signalling between aGW and UE, and for the user plane.

The NAS may be divided into three different states. First, a LTE_DETACHED state if there is no RRC entity in the NAS; second, a LTE_IDLE state if there is no RRC connection while storing minimal UE information; and third, a LTE_AC-TIVE state if the RRC connection is established. Also, the RRC may be divided into two different states such as a RRC_IDLE and a RRC_CONNECTED. In RRC_IDLE state, the UE may receive broadcast of system information and paging information while the UE specifics a Discontinuous Reception (DRX) configured by NAS, and the UE has been allocated an identification (ID) which uniquely identifies the UE in a tracking area. Also, in RRC-IDLE state, no RRC context is stored in the eNB. In RRC_CONNECTED state, the UE has an E-UTRAN RRC connection and a context in the E-UTRAN, as such transmitting and/or receiving data to/from the network (eNB) become possible. Also, the UE can report channel quality information and feedback information to the eNB. In RRC_CONNECTED state, the E-UTRAN knows the cell which the UE belongs to, such that the network can transmit and/or receive data to/from UE, the network can control mobility (handover) of the UE, and the network can perform cell measurements for a neighboring cell.

In RRC_IDLE mode, the UE specifics the paging DRX (Discontinuous Reception) cycle. Namely, the UE monitors a paging signal at a specific paging occasion of every UE specific paging DRX cycle. The paging occasion is a time interval where a paging signal is transmitted. The UE has its own paging occasion. A paging message is transmitted over all cells belonging to the same tracking area. If the UE moves from one tracking area to another tracking area, the UE will send a tracking area update message to the network to update its location.

FIG. 5 shows an exemplary structure of the physical channel. The physical channel transfers signalling and data between the UE Layer 1 (L1) and the eNB Layer 1 (L1). As shown in FIG. 5, the physical channel transfers the signalling and the data with a radio resource which consists of one or more sub-carriers in frequency and one more symbols in time (i.e., 6 or 7 symbols constitute one sub-frame which is 0.5 ms in length). The particular symbol(s) of the sub-frame (e.g. the first symbol of the sub-frame) can be used for the L1/L2 control channel. The L1/L2 control channel carries L1/L2 control information (signalling).

FIG. 6 shows a possible mapping relationship between logical channels and transport channels. In general, the transport channel transfers the signalling and data between L1 and MAC layers, and the physical channel is mapped to the transport channel. Types of downlink transport channels can be described as follows; 1. Broadcast Channel (BCH) used for transmitting system information, 2. Downlink Shared Channel (DL-SCH) characterised by: a) support for HARQ, b) support for dynamic link adaptation by varying the modulation, coding and transmit power, c) possibility to be broadcast in the entire cell, d) possibility to use beamforming, and e) support for both dynamic and semi-static resource allocation, 3. Paging Channel (PCH) used for paging a UE, and 4. Multicast Channel (MCH) used for multicast or broadcast service transmission. Also, types of uplink transport channels can be described as follows; 1. Uplink Shared Channel (UL-SCH) characterised by: a) possibility to use beamforming; (likely no impact on specifications), b) support for dynamic link adaptation by varying the transmit power and potentially modulation and coding, and c) support for HARQ, and 2. Random Access Channel(s) (RACH) used normally for initial access to a cell.

In general, the MAC layer provides data transfer services on the logical channels. As such, a set of the logical channel types is defined for different kinds of data transfer services as offered by the MAC layer. Each logical channel type is defined by what type of information is transferred. For example, the logical channels are classified into two groups: control channels (for the transfer of control plane information) and traffic channels (for the transfer of user plane information). The control channels are used for transfer of control plane information only. A few examples of the control channels offered by MAC are as follows: 1. Broadcast Control Channel (BCCH) which is a downlink channel for broadcasting system control information; 2. Paging Control Channel (PCCH) which is a downlink channel that transfers paging information. This channel is used when the network does not know the location cell of the UE; 3. Common Control Channel (CCCH) which is used by the UEs when there is no RRC connection between the UEs and the network; 4. Multicast Control Channel (MCCH) which is a point-to-multipoint downlink channel used for transmitting MBMS control information from the network to the UE; and 5. Dedicated Control Channel (DCCH) which is a point-to-point bi-directional channel that transmits dedicated control information between a UE and the network. The DCCH is used by the UEs having an RRC connection.

The traffic channels are used for transfer of user plane information only. A few examples of the traffic channels offered by MAC are as follows: 1. Dedicated Traffic Channel (DTCH) which is a point-to-point channel, dedicated to one UE, for the transfer of user information. The DTCH can exist in both the uplink and downlink, and 2. Multicast Traffic Channel (MTCH) which is a point-to-multipoint downlink channel for transmitting traffic data from the network to the UE. The different logical channels are mapped onto different transport channels. For example, in the uplink, the DCCH may be mapped to an UL-SCH, and the DTCH may be mapped to an UL-SCH. Also, in the downlink, the BCCH may be mapped to a BCH, the PCCH may be mapped to a PCH, the DCCH may be mapped to a DL-SCH, and the DTCH may be mapped to a DL-SCH.

In the related art, a size of a cell bandwidth is equal to a size of a UE bandwidth which means that the UE can receive data and/or signaling utilizing the entire span of cell bandwidth at all times. However, if the cell bandwidth is wider (larger) than the UE bandwidth in size, the UE cannot receive data and/or the signaling by utilizing the entire span of cell bandwidth. Thus, in the related art, there is the disadvantage of inefficient use of the entire cell bandwidth, and the UE may lose some of the data and/or signaling from the cell.

The present invention has been developed in order to solve the above described problems of the related art. As a result, the present invention provides a method of transmitting and/or receiving data and/or a signaling on a channel from a cell having a plurality of sub-bandwidths that allows a faster and an efficient way of the data and/or signaling transmission.

Accordingly, the present invention is directed to a method of receiving the data and/or signaling from the cell that substantially obviates one or more problems due to limitations and disadvantages of the related art.

To implement at least the above feature in whole or in parts, the present invention provides a method of receiving the data and/or signaling from the cell, in which the cell divides cell bandwidth into more than one sub-bandwidth, selecting one of sub-bandwidths for a terminal and transmitting the data and/or signaling for the terminal on the selected sub-bandwidth and by which the terminal can receive all of the data and/or signaling from the cell without any loss.

The method further includes the steps of transmitting information for selecting one of the divisions of cell bandwidth, receiving decision on the selected division of cell bandwidth from the cell, and receiving data or signaling on the selected division of cell bandwidth.

The method further includes the step of transmitting results of a measurement performed by the terminal on the information for selecting one of the divisions of the cell bandwidth.

The method further includes the step of transmitting the information for selecting one of the divisions of the cell bandwidth on a random access channel used for accessing the cell.

Additional features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

FIG. 1 shows an exemplary network structure of the E-UMTS.

FIG. 2 shows an exemplary structure (architecture) of the E-UTRAN.

FIG. 3 shows an exemplary structure (architecture) of the User-plane protocol stack between the mobile terminal, the eNodeB, and the AG.

FIG. 4 shows an exemplary structure (architecture) of the Control-plane protocol stack between the mobile terminal, the eNodeB, and the AG.

FIG. 5 shows an exemplary structure of the physical channel.

FIG. 6 shows a possible mapping relationship between the logical channels and the transport channels in which the related art and the present invention are applied.

FIG. 7 shows an exemplary diagram illustrating a sub-bandwidth of the cell bandwidth.

FIG. 8 shows an exemplary diagram illustrating an allocation of the cell bandwidth for the UE bandwidth.

FIG. 9 shows an exemplary procedure for allocation of downlink sub-bandwidth according to the present invention.

FIG. 10 shows an exemplary diagram illustrating a division of L1/L2 control channel.

FIGS. 11 and 12 show an exemplary diagram illustrating a division of control channels.

FIG. 13 shows an exemplary diagram illustrating two cells of contiguous bandwidths.

One aspect of the present invention is the recognition by the present inventors regarding the problems and drawbacks of the related art described above and explained in more detail hereafter. Based upon such recognition, the features of the present invention have been developed.

Although the present invention is shown to be implemented in a mobile communication system, such as a UMTS developed under 3GPP specifications, the present invention can also be applied to other communication systems operating in conformity with different standards and specifications.

As network technology continues to develop, it is foreseen that RNCs may no longer be necessary in future networks, because Node Bs with enhanced capabilities, or other types of network entities (e.g. so-called Access Gateways) may handle the operations performed by currently existing RNCs. Such long-term evolution (LTE) issues further support the need to develop improved radio admission control techniques to be used in admitting new terminals (or establishing new user links) and supporting newly developing enhanced services for a greater number of terminals being managed by the network.

FIG. 7 shows an exemplary diagram illustrating a sub-bandwidth of cell bandwidth. When the cell bandwidth is larger than a minimum UE bandwidth which all of UEs are required to support, then the cell should allocate a fraction of the cell bandwidth to the UE. However, when the UE is in an idle mode, the cell can not know existence of the UE. Thus, as illustrated in FIG. 7, the cell bandwidth may need to be divided into multiple sub-bandwidths having the same size of bandwidth which are equal to the minimum UE bandwidth. Here, the sub-bandwidth should support the minimum UE bandwidth, and the UE with minimum bandwidth would move to one of sub-bandwidths in the cell. The sub-bandwidth may be configured in both the downlink and uplink.

FIG. 8 shows an exemplary diagram illustrating an allocation of the cell bandwidth for the UE bandwidth. As illustrated in FIG. 8, if the cell bandwidth is larger than the UE bandwidth on DL (e.g., if the UE supports 10 MHz on DL/UL and the cell supports 10 MHz on UL and 20 MHz on DL (length of sub-bandwidth is 10 MHz)), the cell needs to decide which sub-bandwidth on DL (i.e. which 10 MHz on DL) should be used for a response of initial access (RACH) and an initial access or a RRC connection setup procedure on a SCH for the UE.

FIG. 9 shows an exemplary procedure for allocation of downlink sub-bandwidths according to the present invention. As illustrated in FIG. 9, there are several options of the procedure for the allocation of DL bandwidth. The first option is that the UE may transmit any information about the sub-bandwidth(s) to the eNB (cell) (S1), and then the UE should be allocated based on the information (S2). In some cases, the UE may not transmit a measurement report, which may include information on the sub-bandwidth, on a Random Access Channel (RACH) (S1) to the cell because the amount of information on the RACH is usually too restrictive. Thus, if the RACH does not carry any information about the sub-bandwidth, the cell may blindly (i.e., unconditionally) decide which sub-bandwidth of the UE should be allocated (S2). Afterwards, if the UE transmits the measurement report on the UL SCH (S3), then the cell may re-allocate a part of DL bandwidth suitable for the UE (S4).

The second option is to designate one DL sub-bandwidth for a response of an initial access or a RRC connection procedure. Thus, during the allocation of the sub-bandwidth (S2, S4), the DL sub-bandwidth may be designated for the response of the initial access and/or the RRC connection procedure. Afterward, the eNB may re-allocate the UE to another sub-bandwidth on DL. In this case, the UE may receive system information from the eNB before performing the RACH procedure (S1), and the system Information may indicate which sub-bandwidth on DL will be designated for the response of the initial access and/or the RRC connection procedure. As such, the UE may know the designated DL sub-bandwidth by receiving the system information.

The third option is that the UE may decide which part of the cell bandwidth (e.g., which 10 MHz bandwidth) provides the best result of the data transmission, and then the UE may indicate information on its preference of the DL sub-bandwidth on the RACH (S1). Afterward, based on the information from the UE, the cell may decide which part of the DL bandwidth the UE should be positioned on. When the cell decides, the cell may also consider a status of DL resource allocation of the cell. Therefore, the cell may indicate to the UE which part of DL bandwidth the UE should be located on when the cell responds to the RACH.

When the UE is connected to the cell, the eNB may request the UE in RRC connected mode to report measurement results by sending a Measurement Control message in order to decide which part of DL bandwidth the UE should be placed on to receive a DL channel (S5). Afterwards, the UE may report the measurement results to the eNB including a radio channel status such as a path loss and a received power level to the cell (S6). Based on the measurement results, the cell may decide which part of the DL bandwidth (i.e. which sub-bandwidth of 20 MHz cell bandwidth (upper or lower 10 MHz)) the UE should be placed on (S7). If the cell indicates which part of DL bandwidth the UE should receive, then the UE may start to receive a channel on the part of DL bandwidth that the cell indicated.

FIG. 10 shows a diagram illustrating a division of L1/L2 control channel. For every sub-frame (i.e., 0.5 ms), the cell may indicate the allocation of resource using a L1/L2 control information/channel. Usually, the L1/L2 control information may not be UE dedicated information. So, all the relevant UEs may receive the same L1/L2 control information simultaneously. However, the L1/L2 control information should also be decodable by the UE with a minimum UE Bandwidth capability. Thus the bandwidth of the L1/L2 control information may not be larger than the minimum UE Bandwidth.

As illustrated in FIG. 10, when the cell bandwidth is larger than the minimum UE Bandwidth, separate L1/L2 control information/channel may need to be transmitted on each sub-bandwidth. Also, different sub-bandwidths may transmit different L1/L2 control information/channels. The UE with the minimum UE Bandwidth capability may receive the L1/L2 control information/channel from only one of sub-bandwidths. For the UE with the bandwidth capability larger than the minimum UE Bandwidth, the UE may receive more than one L1/L2 control information/channel from several sub-bandwidths at the same time.

The sub-bandwidth, which the UE receives to acquire the L1/L2 control information, may be indicated on a dedicated channel by the eNB for a connection mode of the UE. The sub-bandwidth, which the UE receives to acquire L1/L2 control information, may be indicated on a broadcast channel by the eNB for an idle mode of the UE.

FIG. 11 shows a diagram illustrating a division of control channels. For the UE with the minimum bandwidth to receive paging information and system information, the bandwidth of a SynchCH (Synchronization Channel used for DL synchronization procedure), a PCH, a BCH, a paging message or the system information may not be larger than the minimum UE Bandwidth. Thus, as illustrated in FIG. 11, the SynchCH, the PCH, the BCH and the L1/2 Control Channel/Information may need to be divided based on the length of one sub-bandwidth.

In the Idle mode of the UE, the sub-bandwidth on which the PCH is transmitted may be indicated in the BCH. The idle UE may select one of the sub-bandwidths randomly or according to its UE identity such as a P-Temporary Mobile Subscriber Identity (P-TMSI) and/or an International Mobile Subscriber Identity (IMSI). Then, the idle UE may read the paging message or the system information broadcast on the selected sub-bandwidth. Also, the eNB may transmit the paging message for the UE on the selected sub-bandwidth.

As shown in FIG. 11, the SynchCH is 1.25 MHz in size within the length of one sub-bandwidth. In case of a 20 MHz cell bandwidth, the SynchCH may be divided into two channels: one channel for an upper 10 MHz and the other channel for a lower 10 MHz. Also the BCH may be divided into two types of BCH i.e. a Primary BCH (P-BCH) and a Secondary BCH(S-BCH). The P-BCH may be located on the center of the cell bandwidth and the S-BCH on each sub-bandwidth. Thus, different S-BCH channels are transmitted on different sub-bandwidths of the cell. For any incoming UE to the cell, the UE may first scan the SynchCH. Then, the UE may receive the P-BCH if the synchronization is complete. By receiving the P-BCH, the UE may know information on cell bandwidth and sub-bandwidths.

When system information on the BCH is changed (i.e., updated), the UE may be notified the change. The notification may be broadcast on the S-BCH or another channel in each sub-bandwidth. The notification may include either a one-bit indicator or the changed information element itself. If the one-bit indicator is broadcast on a sub-bandwidth which the UE is located on, the UE may transit to another sub-bandwidth which changed information on the BCH is transmitted on. If the changed information itself is broadcast, the UE may receive the changed information without transition.

FIG. 12 shows a different diagram illustrating a different structure of division of control channels.

As shown in FIG. 12, the BCH may be divided into three types of the BCH, i.e. a P-BCH, an S-BCH and an A-BCH (Auxiliary Broadcast channel). In this case, the P-BCH may be used to indicate the location of the S-BCH. Therefore, allocated resource information on the S-BCH may be broadcast on this channel when the cell bandwidth is larger than bandwidth of the minimum UE bandwidth capability. Here, the selected bandwidth for the P-BCH may be same as a bandwidth for the SynchCH. Also, the timing of the P-BCH which is related to the SynchCH may be known to all the UEs beforehand. The S-BCH may be used to broadcast system information. The bandwidth of the S-BCH may be same as the sub-bandwidth to allow fast acquisition and to ease scheduling.

When the cell bandwidth is smaller or equal to the minimum UE bandwidth, the entire cell bandwidth may be used for the S-BCH. If there is a change (or update) of system information, the BCH may broadcast the changed system information. Here, the A-BCH may exist on all the sub-bandwidths. The A-BCH may be used to prevent the UE from hopping between the sub-bandwidths to receive the updated system information.

When the cell BW is wider than the UE bandwidth on an uplink (UL), (e.g., if the UE supports 10 MHz on UL and the cell supports 20 MHz on UL) the cell may decide which sub-bandwidth the UE should use for an UL transmission. If the UL 10 MHz and the DL 10 MHz is not always linked, the cell may receive uplink pilots on wider UL bandwidth than 10 MHz (e.g. 20 MHz from the UE). Then, the cell may decide which UL sub-bandwidth the UE use based on a measurement of uplink pilots transmitted from the UE. In this case, even in the case a certain UL sub-bandwidth is allocated to the UE, the UE may need to transmit uplink pilots outside of the allocated UL sub-bandwidth within the whole span of UL cell bandwidth.

For example, if there is no traffic on the UL SCH on a sub-frame, the UE may transmit the uplink pilots at an inactive sub-frame on the outside of the allocated UL sub-bandwidth on which the UE previously transmitted the uplink data. After measuring the uplink pilots, the cell may re-allocate a better UL bandwidth to the UE based on the measurement. In this case, the eNB may control transmission of the uplink pilots from the UE. (e.g. when/where/how often the uplink pilot should be transmitted on different bandwidths than the UL sub-bandwidth on which the UE transmits uplink data) To do this, the eNB may indicate the control information on the transmission of the uplink pilots to the UE.

The L1/L2 control & paging Information may be used to indicate a resource allocation for the UE which locates on the sub-bandwidth. This information may be broadcast on each sub-bandwidth. The UE may read more than one L1/L2 control information if its capability allows such reading. The bandwidth of each L1/L2 control & paging information may also be the same as the bandwidth of the sub-bandwidth. Additionally, this information may be used to page the UE as well. The UE may know that there will be an incoming call or traffic for the UE by tracking the UE identity from this information. Also, this information may include resource allocation information for the A-BCH if changed system information has to be broadcast on the sub-bandwidth. The resource allocation information for the A-BCH may indicate what type of resource will be transmitted on the A-BCH.

During the initial phase (e.g., while the UE accesses a cell or sets up a RRC connection), the UE may decide which UL bandwidth is used for the initial random access based on the UE measurement of DL path loss or Access Service Class (ASC). For example, before accessing to the cell, the UE may measure a downlink channel (e.g. pilots, SynchCH or BCH), and then may calculate the DL path loss of each sub-bandwidth. Afterward, the UE may transmit the RACH on the UL sub-bandwidth corresponding to the DL sub-bandwidth which had the best measurement results. This may be very useful for a Time Division Duplex (TDD) mode.

Alternatively, if the UL sub-bandwidth and the DL sub-bandwidth are linked (e.g. if the UL 10 MHz and DL 10 MHz is linked), this type of linking information may be transmitted on system information or a paging message. Afterwards, when the UE transmits the RACH on a certain UL sub-bandwidth, the UE may receive a response of the RACH on the DL sub-bandwidth which is linked to the UL sub-bandwidth. Also, when the UE receives a paging message on a certain DL sub-bandwidth, the UE may transmit the RACH on the UL sub-bandwidth which is linked to the DL sub-bandwidth. If the paging message indicates which UL sub-bandwidth the UE should use, the UE may use the UL sub-bandwidth to transmit the RACH. If the paging message indicates which DL sub-bandwidth the UE should use, the UE may use the DL sub-bandwidth to receive the response of the RACH.

The FIG. 13 shows a diagram that bandwidths of two cells belonging to the same eNB are contiguously placed. In this case, if the SCH/BCH is transmitted in DL bandwidth 2, then there is no need for the SCH/P-BCH in DL bandwidth 1 because UEs located on the bandwidth 1 may acquire a DL synchronization by receiving the SynchCH on the bandwidth 2 and may also acquire system information by receiving the BCH on the bandwidth 2. The DL bandwidth 1 and 2 may belong to different cells controlled by the same eNB.

The RRC connected UEs may report channel quality (e.g. CQI: Channel Quality Indicator) to the cell. When the UE reports the channel quality, the UE may report a channel quality of the sub-bandwidths of the bandwidth 1 as well as the sub-bandwidths of the bandwidth 2.

In the meantime, the eNode B may provide frequency information on each neighboring cell to the UE. Based on the frequency information, the eNB and the UE may decide whether the UE performs an inter-frequency measurement or an intra-frequency measurement on a specific neighboring cell. Normally, if the neighboring cell is placed on a different frequency bandwidth than the current cell where the UE is located, the UE receiving the downlink channel on the current cell may not measure the neighboring cell without any gap of time interval. Thus, the UE receiving the downlink channel on the current cell may need a gap of time interval to measure the neighboring cell. This kind of measurement may be called inter-frequency measurement because the UE has to completely re-tune its receiver to switch from the current cell to the neighboring cell. On the other hand, if the neighboring cell is placed on same frequency bandwidth as compared to the current cell where the UE is located, a certain UE receiving the downlink channel on the current cell may measure the neighboring cell without any gap of time interval. This kind of measurement may be called intra-frequency measurement because the UE may receive the neighboring cell while receiving the current cell.

If the eNB orders the UE to perform the inter-frequency measurement, the eNode B scheduler may create a gap of time interval to the UE, and then the UE may perform the inter-frequency measurement of the neighboring cell during the gap. If the eNB does not know whether or not the UE need to perform the intra-frequency measurement procedure to measure the neighboring cell, then the UE may indicate the eNB whether the UE is capable of performing the intra-frequency measurement for the neighboring cell or not. The indication may include the UE capability of re-tuning pilot and/or a channel by a base-bandwidth digital processing.

The eNB may decide whether the UE needs to perform the intra-frequency measurement or the inter-frequency measurement for the neighboring cell based on the indication sent from the UE. If the UE is capable of performing the intra-frequency measurement for the neighboring cell, the eNB may order the UE to perform the intra-frequency measurement for the neighboring cell. If the UE is not capable of performing the intra-frequency measurement for the neighboring cell, the eNB may order the UE to perform the inter-frequency measurement for the neighboring cell.

Here, to determine which measurements need to be perform (either the intra-frequency measurement or the inter-frequency), the location of sub-bandwidths of the current and neighboring cells with the UEs bandwidths may become a determining factor. For example, if the current cell (C1) and the neighboring cell (C2) are exactly overlapped on the same bandwidths and the bandwidth of the two cells are larger than the bandwidth of the UE, then the UE always performs the intra-frequency measurement of the neighboring cell with the same bandwidth as the current cell because the UE does not need to re-tune its receiver. However, if the two cells (C1, C2) are adjoining with different bandwidths (i.e. C1 with 20 MHz, C2 with 10 MHz), the type of the measurement may be decided by the location of the bandwidth of the UE. When the bandwidth of the UE camps on the current cell (C1) which receives an entire bandwidth of the neighboring cell (C2) without any re-tuning, then the UE may perform the intra-frequency measurement for the neighboring cell (C2). When the bandwidth of the UE camps on the current cell (C1) which does not overlap with any part of the bandwidth of the neighboring cell (C2), then the UE may perform the inter-frequency measurement for the neighboring cell (C2). When the bandwidth of the UE camps on the current cell (C1) which does overlap with some part of the bandwidth of the neighboring cell (C2), then the UE may perform either the inter-frequency measurement or the intra-frequency measurement depending upon situation (e.g., SCH design, UE implementation).

The present invention provides a method of handling mobile communications, the method comprising: allocating one or more sub-bandwidths of a cell bandwidth in order to support uplink or downlink communications; performing uplink or downlink communications according to the one or more allocated sub-bandwidths; dividing the cell bandwidth into multiple sub-bandwidths; receiving signaling from a mobile terminal to determine how the allocating step is to be performed; transmitting, to a mobile terminal, information related to the allocation of the one or more sub-bandwidths of the cell bandwidth, wherein the allocation of the one or more sub-bandwidths is based upon the received signaling from the mobile terminal; receiving system information which includes one or more designated sub-bandwidths of the cell bandwidth for at least one of an initial access response and a RRC connection setup; transmitting a measurement control message to request a mobile terminal to report measurement results; receiving information from a mobile terminal; and determining whether to perform intra-frequency measurement or inter-frequency measurement for the neighboring cell measurement based on the received information; wherein the one or more allocated sub-bandwidths are used for at least one of an initial access, a response of the initial access and a connection setup; wherein the initial access is related to random access procedures, and the connection setup is related to radio resource control; wherein a bandwidth size of each sub-bandwidth is equal to a minimum bandwidth size of the terminal; wherein control channel information is transmitted via the at least one or more sub-bandwidths; wherein the control channel information is related to at least one of a synchronization channel, a paging channel (PCH), a broadcast channel (BCH), a paging message, and system information; wherein the information includes a mobile terminal's capability information for performing the neighboring cell measurement; wherein the cell bandwidth is contiguously connected to one or more other cell bandwidth if the one or more other cell bandwidth are controlled by same network.

Also, the present invention provides a method of handling mobile communications, the method comprising: receiving allocation of one or more sub-bandwidths of a cell bandwidth in order to support uplink or downlink communications; performing uplink or downlink communications according to the one or more allocated sub-bandwidths; transmitting signaling to a network to determine how the receiving allocation step is to be performed; receiving a measurement control message for performing a measurement; measuring a channel quality of a cell after the receiving the measurement control message; reporting the channel quality of the cell to a network; receiving allocation of one or more sub-bandwidths of the cell bandwidth based on the reported channel quality of the cell to the network; measuring a neighboring cell by obtaining frequency information about the neighboring cell from a base station; determining whether to perform an inter-frequency measurement or an intra-frequency measurement based on the obtained frequency information about the neighboring cell; performing the inter-frequency measurement if the neighboring cell is located in different frequency bandwidth compare to a current cell of a mobile terminal; and performing the intra-frequency measurement if the neighboring cell is located in same frequency bandwidth compare to a current cell of a mobile terminal; wherein the cell bandwidth is divided into multiple sub-bandwidths by a network; wherein the signaling is related to at least one of a random access information, a measurement result, and system information; wherein the random access information includes a certain one or more sub-bandwidths on a Random Access Channel (RACH) by the terminal; wherein the random access information includes a measurement result; wherein the measurement result includes at least one of a path loss and power level to the cell; wherein the allocation of the one or more sub-bandwidths is determined randomly if the signaling has no information; wherein the signaling includes information to indicate one or more designated sub-bandwidths; wherein the one or more designated sub-bandwidths are used for at least one of an initial access response and a Radio Resource Control (RRC) connection setup; wherein the inter-frequency measurement is performed with re-tuning of a receiver in the mobile terminal for switching the current cell to the neighboring cell; wherein the intra-frequency measurement is performed without any gap of time interval; wherein the intra-frequency measurement is performed without re-tuning of a receiver in the mobile terminal for switching the current cell to the neighboring cell.

Although the present invention is described in the context of mobile communications, the present invention may also be used in any wireless communication systems using mobile devices, such as PDAs and laptop computers equipped with wireless communication capabilities (i.e. interface). Moreover, the use of certain terms to describe the present invention is not intended to limit the scope of the present invention to a certain type of wireless communication system. The present invention is also applicable to other wireless communication systems using different air interfaces and/or physical layers, for example, TDMA, CDMA, FDMA, WCDMA, OFDM, EV-DO, Wi-Max, Wi-Bro, etc.

The exemplary embodiments may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Field Programmable Gate Array (FPGA), Application Specific Integrated Circuit (ASIC), etc.) or a computer readable medium (e.g., magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.).

Code in the computer readable medium may be accessed and executed by a processor. The code in which exemplary embodiments are implemented may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the present invention, and that the article of manufacture may comprise any information bearing medium known in the art.

Any reference in this specification to "one embodiment", "an embodiment", "example embodiment", etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

The invention claimed is:

1. A method of handling mobile communications, the method comprising:
    receiving, by a network, signaling from a mobile terminal to determine how to allocate at least one sub-bandwidth of a cell bandwidth to support uplink or downlink communications;
    allocating, by the network, the at least one sub-bandwidth according to the received signaling from the mobile terminal;
    transmitting, from the network to the mobile terminal, information associated with the allocation of the at least one sub-bandwidth;
    performing, by the network, uplink or downlink communications via the at least one allocated sub-bandwidth,
    wherein a bandwidth size of each of the at least one allocated sub-bandwidth is equal to a minimum bandwidth size of the mobile terminal;
    transmitting, by the network, a measurement control message to request the mobile terminal to report measurement results;
    measuring, by the mobile terminal, a channel quality of a cell after receiving the measurement control message; and
    using the measured channel quality to decide which part of the cell bandwidth the mobile terminal should receive,
    wherein measuring the channel quality comprises:
        measuring, by the mobile terminal, a neighboring cell by obtaining frequency information regarding the neighboring cell; and
        determining, by the mobile terminal, whether to perform an inter-frequency measurement or an intra-frequency measurement based on the obtained frequency information,
    wherein it is determined to perform the intra-frequency measurement if the neighboring cell is located in a same frequency bandwidth as a current cell of the mobile terminal, and
    wherein the intra-frequency measurement is performed without re-tuning of a receiver in the mobile terminal for switching from the current cell to the neighboring cell.

2. The method of claim 1, further comprising: dividing, by the network, the cell bandwidth into multiple sub-bandwidths.

3. The method of claim 1, further comprising: using the at least one allocated sub-bandwidth for at least an initial access, a response to the initial access, or a connection setup.

4. The method of claim 3, wherein the initial access is associated with random access procedures and the connection setup is associated with a radio resource control.

5. The method of claim 1, further comprising: transmitting control channel information via the at least one allocated sub-bandwidth.

6. The method of claim 5, wherein the control channel information is associated with at least a synchronization channel, a paging channel (PCH), a broadcast channel (BCH), a paging message, or system information.

7. The method of claim 1, further comprising: receiving, by the mobile terminal, system information including at least one designated sub-bandwidth of the cell bandwidth for at least an initial access response or a Radio Resource Control (RRC) connection setup.

8. The method of claim 1, wherein the cell bandwidth is contiguously connected to at least one other cell bandwidth when the at least one other cell bandwidth is controlled by a same network as the cell bandwidth.

9. A method of handling mobile communications, the method comprising:
    transmitting, by a mobile terminal, signaling to a network to determine how allocation of at least one sub-bandwidth of a cell bandwidth should be performed;
    receiving, by the mobile terminal, a measurement control message for performing a measurement;
    measuring, by the mobile terminal, a channel quality of a cell in response to receiving the measurement control message;
    reporting, by the mobile terminal, the channel quality of the cell to the network; and
    receiving, by the mobile terminal, allocation of the at least one sub-bandwidth of the cell bandwidth to support uplink or downlink communications; and
    performing, by the mobile terminal, uplink or downlink communications according to the at least one allocated sub-bandwidth,
    wherein the allocation of the at least one sub-bandwidth is based on the reported channel quality of the cell, and
    wherein a bandwidth size of each of the at least one sub-bandwidth is equal to a minimum bandwidth size of the mobile terminal,
    wherein the reported channel quality is to be used to decide which part of the cell bandwidth the mobile terminal should receive,
    wherein measuring the channel quality comprises:
        measuring, by the mobile terminal, a neighboring cell by obtaining frequency information regarding the neighboring cell; and
        determining, by the mobile terminal, whether to perform an inter-frequency measurement or an intra-frequency measurement based on the obtained frequency information,
    wherein it is determined to perform the intra-frequency measurement if the neighboring cell is located in a same frequency bandwidth as a current cell of a mobile terminal, and
    wherein the intra-frequency measurement is performed without re-tuning of a receiver in the mobile terminal for switching from the current cell to the neighboring cell.

10. The method of claim 9, wherein the signaling is associated with at least random access information, a measurement result, or system information.

11. The method of claim 9, wherein the measured channel quality includes at least a path loss or a power level.

12. The method of claim 9, wherein the allocation of the at least one sub-bandwidth is determined randomly when the signaling does not include any information.

13. The method of claim 9, wherein the signaling includes information to indicate at least one designated sub-bandwidth.

14. The method of claim 13, wherein the at least one designated sub-bandwidth is used for at least an initial access response or a Radio Resource Control (RRC) connection setup.

15. The method of claim 9, wherein it is determined to perform the inter-frequency measurement when the neighboring cell is located in a frequency bandwidth which is different from the current cell of the mobile terminal.

16. The method of claim 15, wherein the inter-frequency measurement is performed with re-tuning of the receiver in the mobile terminal for switching from the current cell to the neighboring cell.

17. The method of claim 9, wherein performing the intra-frequency measurement comprises performing the intra-frequency measurement without any gap of time interval.

* * * * *